May 23, 1961  R. E. CLOTFELTER  2,984,900
CLADDING ASSEMBLY
Filed Jan. 6, 1960
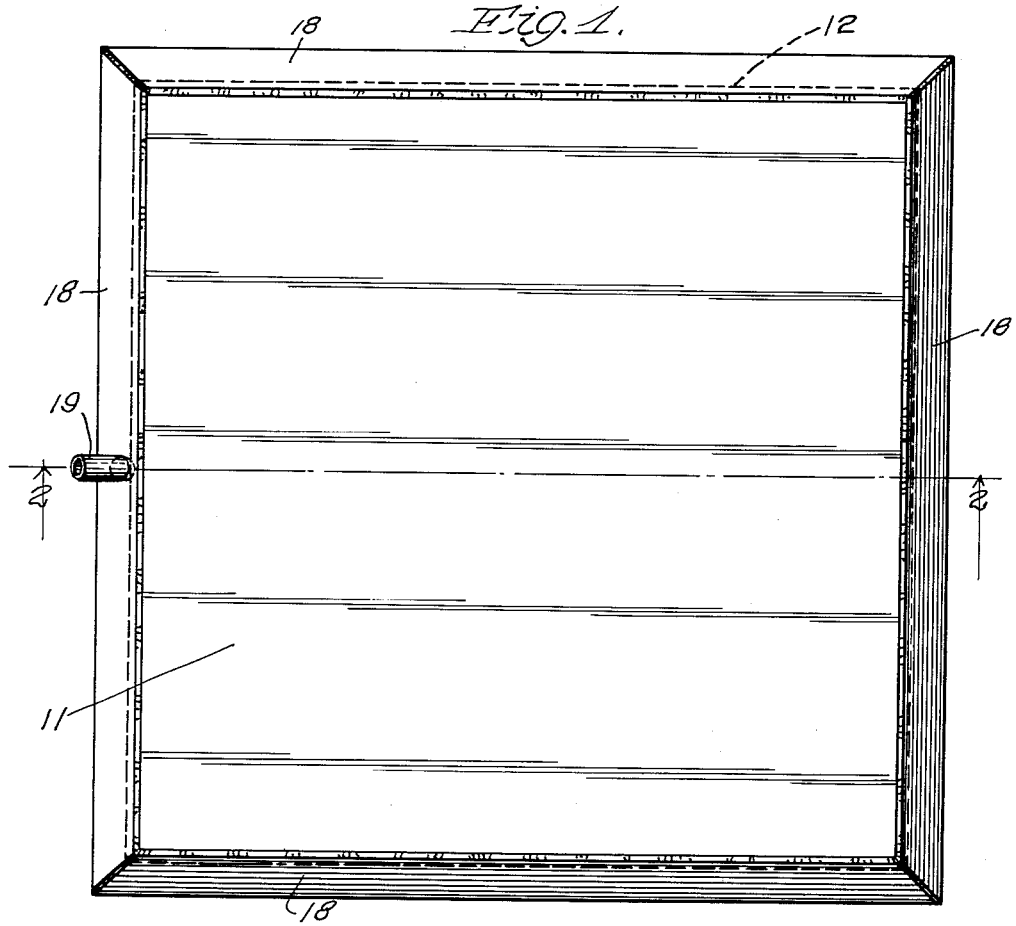
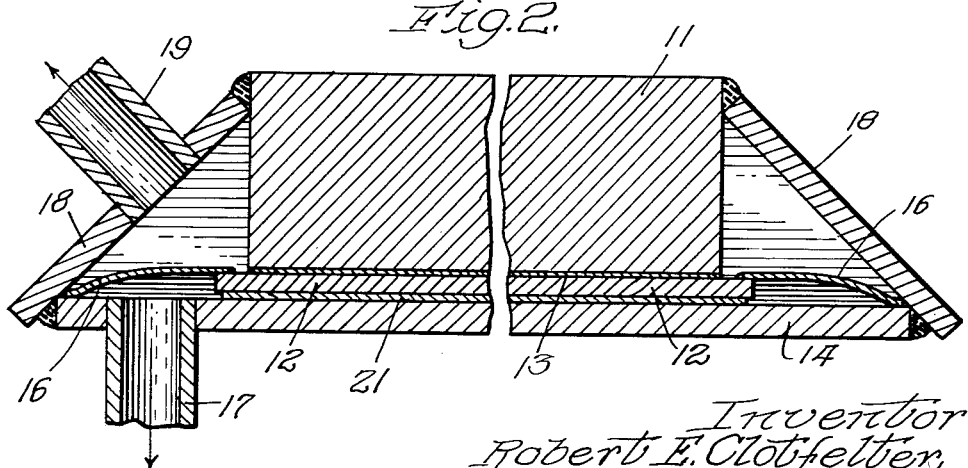
Inventor:
Robert E. Clotfelter,
By Merriam, Smith & Marshall,
Attys.

United States Patent Office 2,984,900
Patented May 23, 1961

2,984,900

CLADDING ASSEMBLY

Robert E. Clotfelter, Birmingham, Ala., assignor to Chicago Bridge & Iron Company, Chicago, Ill., a corporation of Illinois Filed Jan. 6, 1960, Ser. No. 803

4 Claims. (Cl. 29—471.5)

This invention relates to a cladding method and assembly, and more particularly, to a single sandwich cladding asembly which is particularly advantageous in the cladding of thick base plates.

This invention is intended to be used in connection with the vacuum brazing of one sheet or plate to another sheet or plate, usually of different characteristics. The basic process for carrying out such a treatment is shown in U.S. Patent No. 2,713,197, issued July 19, 1955, to Robert L. Brown. In that process a vacuum is applied to the space between the cladding plate and the base plate so that the pressure of the atmosphere is exerted to force the two plates together while the brazing material between them is melted. The present invention is primarily designed for use when a thick base plate, particularly a base plate of 1½" or more in thickness, is to be clad with a plate which has a different rate of heat expansion. In addition to preventing wrinkling of the cladding plate caused by unequal heat expansion of the cladding and base plates, the sandwich assembly of the invention prevents undesirable migration of brazing material and in addition prevents the outgasses released from the cover plate from coming in contact with the brazed joint. As a result, plates clad in accordance with the invention are uniformly bonded throughout, and notably along the edges where imperfect bonding is particularly likely to occur with thick base plates clad by procedures heretofore known.

The invention will be described in detail in conjunction with the accompanying drawings, in which:

Figure 1 is a top view of a cladding sandwich assembled in accordance with the invention; and Figure 2 is a cross sectional view along the line 2—2 of Figure 1.

As shown in the drawings the cladding sandwich of the invention comprises a base plate 11 which may have a thickness of 1½" or more. Cladding plate 12 is placed in face-to-face arrangement with base plate 11 with a supply of brazing material 13 interposed between the plates. The choice of brazing material is well within the abilities of those skilled in the art and depends on the particular metals being joined. Typical brazing materials which are useful include copper and copper-base alloys, nickel-, manganese- and nickel-manganese base alloys, silver-base alloys or any other suitable metal or alloy.

In the embodiment shown in the figures, cladding plate 12 overlaps base plate 11 and is in turn overlapped by cover plate 14. A thin, flexible baffle 16 is attached as by welding between the edge of cladding plate 12 and the edge of cover plate 14, thereby creating a first evacuable zone defined by baffle 16, cover plate 14, and cladding plate 12. A suitable conduit 17 communicates with this zone and leads to a vacuum system (not shown).

Channel bars 18 are welded around the periphery of the sandwich between cover plate 14 and base plate 11, to form a second evacuable zone defined by channel bars 18, base plate 11, baffle 16 and cladding plate 12. A second vacuum conduit 19 connects this evacuable zone to the vacuum system (not shown).

As an optical but generally desirable feature there is placed between cladding plate 12 and cover plate 14 a loose, expendable protector sheet 21 of metal, for example, ingot iron. The function of this protector sheet is to prevent undesirable carbon migration between the cover plate and the cladding plate.

Baffle 16 can be made of any material which can be welded to the cladding plate and the base or cover plates without cracking or other difficulty. The thickness of the baffle should be less than that of the cover plate, so that the baffle, rather than the cladding plate, will flex or bend when necessary, thereby eliminating wrinkles and the like in the cladding plate. Although there are no critical limits on the thickness of the baffle other than that stated, as a practical matter, because of difficulty in welding thin sheets, the baffle is generally no thinner than 16 gauge unless required by a very thin cladding plate. Likewise, baffle thicknesses exceeding 12 gauge have no particular merit and will not usually be necessary.

With the sandwich assembled as described above, brazing is effected by evacuating both the hermetically sealed zones described above through conduits 17 and 19 to vacuums of at least about 18" of mercury and preferably about 28–29", referred to a standard barometer, while heating the sandwich to a temperature above the melting point of the brazing material. It will be seen that sandwich assembly possesses a number of desirable features not heretofore known to the art. The flexible baffle 16 permits longitudinal expansion of cladding plate 12 at a rate different from that of the base plate 11 or cover plate 14. Any unequal expansion between these plates is compensated for by a greater or lesser flexing of the baffle 16 in a longitudinal direction, thereby preventing wrinkling of the cladding plate which might otherwise occur if free relative expansion of the plate were prevented.

Another advantage of the sandwich assembly of the invention stems from the fact that there is no path by which molten brazing material 13 can reach the surface of the cladding plate 12 adjacent the protector sheet 21, i.e., the finished surface of the composite clad plate. It is known that brazing materials, especially copper, have a surprising ability to migrate by capillary action along any surface in contact therewith. Thus, considerable difficulty has heretofore been experienced, particularly when using copper as the brazing material, with sandwiches in which all the plates were brazed together so as to be unseparable. It will be seen that baffle 16 prevents the passage of brazing material 13 to the outer surface of cladding plate 12, thus eliminating possible difficulties in separating plates 12, 21, and 14 after brazing is completed.

A further advantage of the invention results from the fact that the brazing zone is isolated from the separator sheet, the cover plate, and the outer surface of the cladding plate. During the brazing operation a considerable volume of gas is released, representing gases which are occluded on the plates and also gases resulting from the dissociation of oxides embedded within the surface of the plates. These gases may be oxidizing in nature and may result in imperfect bonding, particularly when using brazing materials such as manganese-nickel alloys which have oxides which form readily and are stable under the conditions of temperature used in brazing and thus prevent perfect brazed joints from being formed. By isolating the brazing zone from the cover and protector plates, the baffle plate limits the volume of outgases which may come in contact with the brazing material. In this way, possible difficulties with improper brazing are further reduced.

Although in the embodiment shown in the figures the baffle plate 16 is welded between the cladding plate 12 and the overlapping edges of cover plate 14, it will be apparent that essentially the same results can be obtained by having the base plate overlap the cladding plate which in turn overlaps the cover plate. With this type of arrangement baffle plate 16 would be connected between the base plate and the cladding plate and would function in the same manner as described above.

The following example is presented to illustrate the invention.

*Example 1*

A clad sandwich was assembled as shown in the drawings using the following materials:

| | |
|---|---|
| Backing plate | 98¾" x 15'⅛", 2⁵⁄₁₆" thick, ASTM A212B. |
| Brazing material | Manganese-nickel alloy foil. |
| Cladding plate | 99¼" x 15'⅝", ¹⁄₁₆" thick, type 316L stainless steel. |
| Protector sheet | 99¼" x 15'⅝", ¹⁄₁₆" thick, type 304L steel. |
| Cover plate | 102½ x 15'⅞", ½" thick, A$t$ steel. |
| Baffle | 2" wide, ¹⁄₁₆" thick, type 410 stainless steel. |
| Channel bar | 3" wide, ¼" thick, A7 steel. |

The sandwich was bonded at a temperature of about 2050° F. under a vacuum of 250–350 microns of mercury for about 100 minutes. No wrinkling or looseness at the edges of the clad was observed, the cladding being firmly bonded throughout.

In another attempt at cladding using exactly the same materials as described above but no baffle plate, looseness at the edges of the clad plate extending for about half the plate periphery was found. It is evident, therefore, that the cladding sandwich and the method of the invention have successfully solved the difficulties formerly encountered in cladding heavy base plates.

The foregoing detailed description has been given for clearness of understanding only, and no unnecessary limitations should be understood therefrom, as modifications will be obvious to those skilled in the art.

What is claimed is:

1. A method of cladding which comprises forming a sandwich structure comprising a base plate and a cladding plate in face-to-face arrangement with a supply of brazing material between said plates in the area to be clad and a cover plate in face-to-face arrangement with said cladding plate; hermetically sealing said cladding plate along its periphery to one of said base plate and said cover plate by means of a thin flexible baffle to form a first evacuable zone; hermetically sealing said cover plate to said base plate along their peripheries to form a second evacuable zone adjacent said first zone; evacuating said zones; and heating the sandwich to effect brazing.

2. A method of cladding which comprises forming a sandwich structure comprising a base plate and a cladding plate overlapping said base plate with a supply of brazing material between said plates in the area to be clad, and a cover plate overlapping said cladding plate and in face-to-face arrangement therewith; hermetically sealing said cladding plate to said cover plate along the peripheries thereof by means of a thin flexible baffle to form a first evacuable zone; hermetically sealing the overlapping edge of said cover plate to said base plate to form a second evacuable zone adjacent said first zone; evacuating said zones; and heating the sandwich to effect brazing.

3. A sandwich for cladding comprising in order, a base plate, a thin layer of brazing metal, a cladding plate overlapping said base plate, a cover plate overlapping said cladding plate, a thin flexible baffle hermetically sealed to the edges of said cladding plate and said cover plate, whereby there is formed a first evacuable zone, hermetic sealing means extending between the edge of said cover plate and said base plate, whereby there is formed a second hermetically sealed zone, and means for connecting said zones to an evacuating means.

4. The sandwich of claim 3 which includes an inner protector sheet disposed between said cover plate and said cladding plate.

References Cited in the file of this patent

UNITED STATES PATENTS 2,919,487    Stiles et al. _____ Jan. 5, 1960

UNITED STATES PATENT OFFICE
CERTIFICATE OF CORRECTION

Patent No. 2,984,900                              May 23, 1961

Robert E. Clotfelter

It is hereby certified that error appears in the above numbered patent requiring correction and that the said Letters Patent should read as corrected below.

Column 1, line 17, for "asembly" read -- assembly --; line 23, for "2,713,197" read -- 2,713,196 --; same column 1, line 36, for "outgasses" read -- outgases --; column 2, line 3, for "optical" read -- optional --.

Signed and sealed this 24th day of October 1961.

(SEAL)
Attest:

ERNEST W. SWIDER                              DAVID L. LADD
Attesting Officer                                 Commissioner of Patents